United States Patent [19]

Fukuda

[11] Patent Number: 5,622,033
[45] Date of Patent: Apr. 22, 1997

[54] TRANSVERSE SEALER FOR A BAG MAKER

[75] Inventor: Masao Fukuda, Shiga, Japan

[73] Assignee: Ishida Co., Ltd., Kyoto, Japan

[21] Appl. No.: 575,512

[22] Filed: Dec. 20, 1995

[30] Foreign Application Priority Data

Dec. 23, 1994 [JP] Japan .................................. 6-336096

[51] Int. Cl.⁶ .............................. B65B 9/20; B65B 51/30
[52] U.S. Cl. ................................................ 53/551; 53/554
[58] Field of Search ........................... 53/551, 552, 554, 53/451, 371.6, 374.3, 374.6

[56] References Cited

U.S. PATENT DOCUMENTS

| | | | |
|---|---|---|---|
| 3,070,931 | 1/1963 | Zwight | 53/552 |
| 4,291,520 | 9/1981 | Prince et al. | 53/551 |
| 4,563,862 | 1/1986 | McElvy | 53/552 |
| 4,757,668 | 7/1988 | Klinkel et al. | 53/551 X |
| 4,965,986 | 10/1990 | Klinkel | 53/551 |
| 5,054,270 | 10/1991 | McMahon | 53/552 |
| 5,062,253 | 11/1991 | Bacon et al. | 53/551 X |
| 5,279,098 | 1/1994 | Fukuda | 53/552 X |
| 5,347,795 | 9/1994 | Fukuda | 53/552 |
| 5,533,322 | 7/1996 | Bacon et al. | 53/551 X |
| 5,551,206 | 9/1996 | Fukuda | 53/551 X |

*Primary Examiner*—Horace M. Culver
*Attorney, Agent, or Firm*—Majestic, Parsons, Siebert & Hsue

[57] ABSTRACT

A bag maker bends an elongated bag-forming film into a tubular shape, moves it longitudinally along a path, seals its mutually overlapping side edges into a tubular shape, fills it with articles to be packaged and simultaneously seals it transversely with a transverse sealer to make individual filled bags. The transverse sealer has a pair of seal jaws opposite each other across the path of the film, each adapted to move in a D-shaped closed trajectory and inwardly towards each other to transversely seal the film over a seal area. A pair of shutters is disposed on the seal jaws so as to each move behind corresponding one of the seal jaws when moving downward. These shutters are biased inward towards each other and normally protrude inwardly from the inward-facing surfaces of the seal jaws so as to prevent articles intended for the next bag to be produced will not be caught between the seal jaws when transverse sealing is effected. The shutters have inwardly facing surfaces each having protrusions and indentations alternately arranged transversely. The protrusions on one of the shutters each face corresponding one of the indentations on the other shutter with a gap therebetween when they are pushed towards each other.

10 Claims, 8 Drawing Sheets

TRANSVERSE SEALER FOR A BAG MAKER

BACKGROUND OF THE INVENTION

This invention relates to a transverse sealer of a bag maker-packaging machine of a so-called form-fill-seal type (herein referred to simply as "a bag maker") and also to a bag maker provided with such a transverse sealer.

A bag maker of the vertical pillow-type as disclosed, for example, in U.S. Pat. No. 5,237,798 issued Aug. 24, 1993, is adapted to seal together the mutually overlapping vertical edge parts of a cylindrically formed bag-forming flexible material (herein referred to as "a film"), to then seal the film pieces transversely over a narrow seal area which is to serve as the boundary between the top edge of one bag and the bottom edge of the adjoining bag to be produced and to cut the film at the center of this seal area to separate the mutually adjacent bags. When a bag maker of this type is used to package articles such as potato chips that break easily, powder-like small pieces tend to be produced copiously as they are dropped into the bags for packaging. Since such small pieces drop more slowly than the articles intended to be packaged, these small pieces are likely to get caught between the film pieces when they are transversely sealed. This affects adversely not only the appearance of the produced bags but also the air-tightness of the seals.

In view of the above, Japanese Utility Model Publication Jikkai 6-20209 disclosed a new transverse sealer provided with a pair of shutters which are placed above a pair of seal jaws and moved towards each other to thereby squeeze the cylindrically formed film immediately before the transverse sealing is effected, thereby preventing slow-falling small pieces of the articles from flowing into the area where transverse sealing takes place.

If such shutters are provided, however, care must still be taken such that the sealing operation should not be started too soon after the shutters are closed so as to prevent those small pieces which have just passed between the closing shutters from becoming caught between the seal jaws. In other words, it was difficult with a prior art transverse sealer to completely prevent powder-like small pieces from getting caught in the seal area.

SUMMARY OF THE INVENTION

It is therefore an object of this invention to provide an improved transverse sealer for a bag maker capable of effectively preventing small pieces of articles to be packaged from becoming caught between the bag-forming film pieces where they are transversely sealed to form individual bags.

It is another object of this invention to provide a bag maker having such a transverse sealer.

A transverse sealer according to the present invention, with which the above and other objects can be accomplished, may be characterized as comprising a pair of seal jaws opposite each other across a path along which the bag-forming film will be transported and a pair of shutters each disposed on one of the seal jaws. The seal jaws are adapted to move inwardly towards each other to transversely seal the film over a seal area and outwardly away from each other. The shutters are adapted to approach each other above the seal area such that articles being dropped for the next bag to be produced will prevented from passing through. The shutters are biased inwardly towards each other and normally protrude inwardly from the seal jaws. The inner surfaces of the shutters which face each other have protrusions and indentations alternately arranged in the transverse direction such that the protrusions on one of the shutters each face corresponding one of the indentations on the other shutter with a gap therebetween when the shutters are moved towards and contact each other.

A bag maker according to the present invention is characterized as incorporating such a transverse sealer.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 4 is a partially sectional side view of the sealing units of FIGS. 2 and 3 when they are compressing film pieces in between;

DETAILED DESCRIPTION OF THE INVENTION

Figure 1:
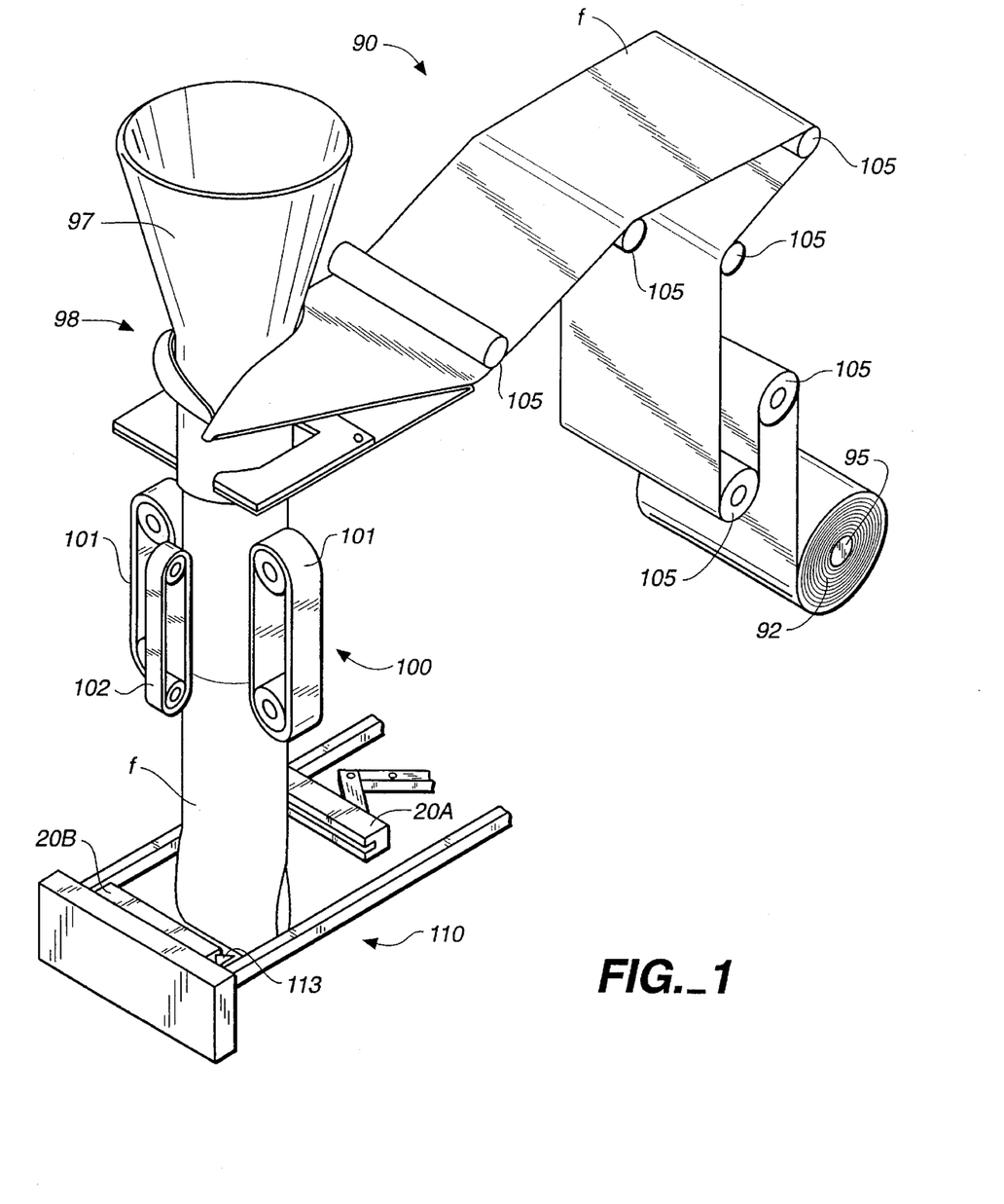
FIG. 1 is a schematic diagonal view of a portion of a bag maker incorporating a transverse sealer embodying this invention.

FIG. 1 shows a vertical pillow type form-fill-seal packaging machine 90 as an example of bag maker incorporating a transverse sealer embodying this invention. An elongated flexible thermoplastic bag-making material f ("a film") is originally in the form of a web roll 92 supported around a shaft 95 (serving as web supporting means). The film f, pulled out of the web roll 92, is guided by a plurality of guide rolls (including dancer rollers) 105 to a former 98, of which the function is to bend the film f into a tubular shape, slides thereon to change the direction of its motion, and is pulled downward by a film-pulling unit 100 including a pair of pull-down belts 101 running parallel to each other and a longitudinal sealer in the form of a heater belt 102 for sealing together the mutually overlapping edge parts of the film f. The film f, which is now in a cylindrical form, is sealed horizontally (that is, transversely to its downward direction of motion) by a transverse sealer 110, the structural and functional characteristics of which will be described in detail below with reference to FIGS. 2–6.

Figure 4:
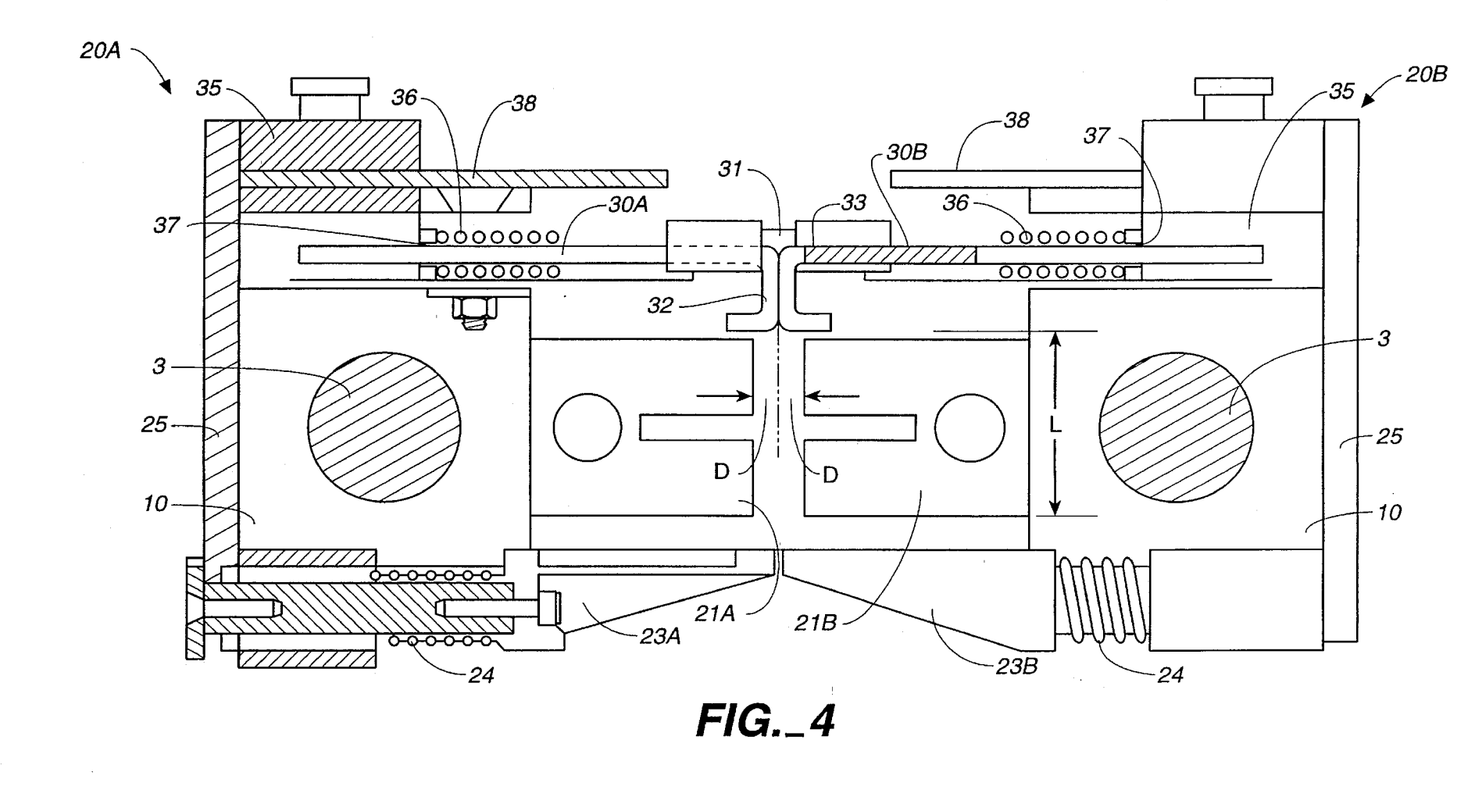
Figure 6:
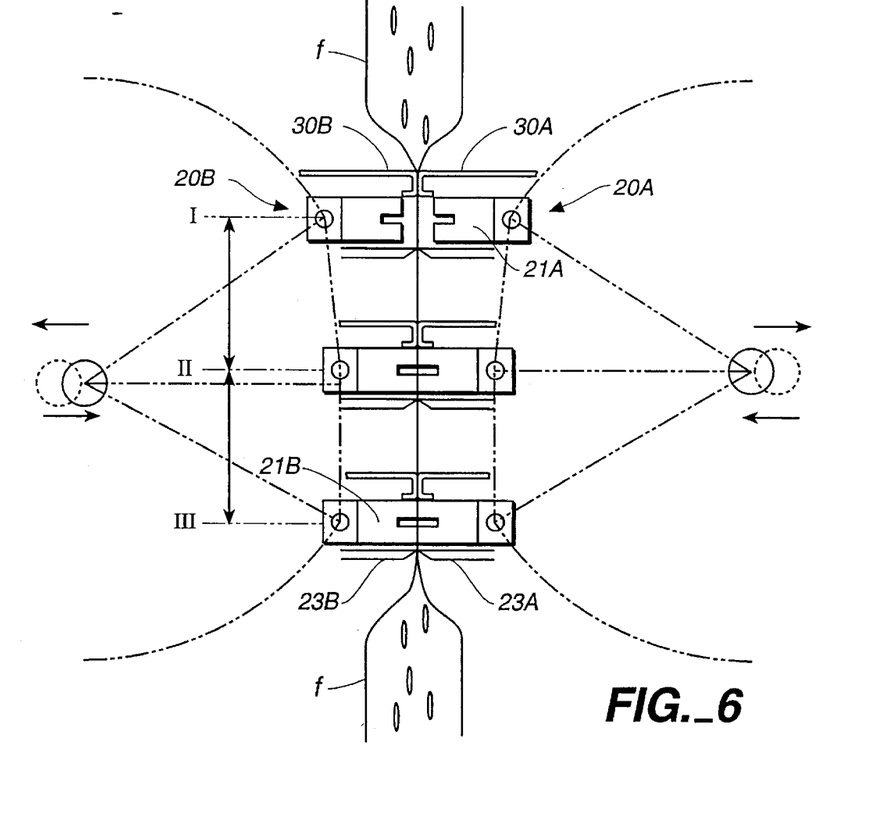
FIG. 6 is a schematic side view of a transverse sealer embodying this invention for showing its operation.

As shown in FIG. 1 schematically and also in FIGS. 4 and 6 more in detail, the transverse sealer 110 has a pair of sealing units 20A and 20B (or 20 when not distinguished) on opposite sides of the path of the film f, each containing a seal jaw 21A or 21B (or 21) supported by a driving means for transmitting power from a power source (not shown) so as to move cyclically on a generally D-shaped trajectory in a vertical plane (including a substantially vertical and straight portion along the path of the film f and an arcuate return path, as shown in FIG. 6), as disclosed by the present inventor in Japanese Patent Publication Tokkai 5-77805.

Figure 5:
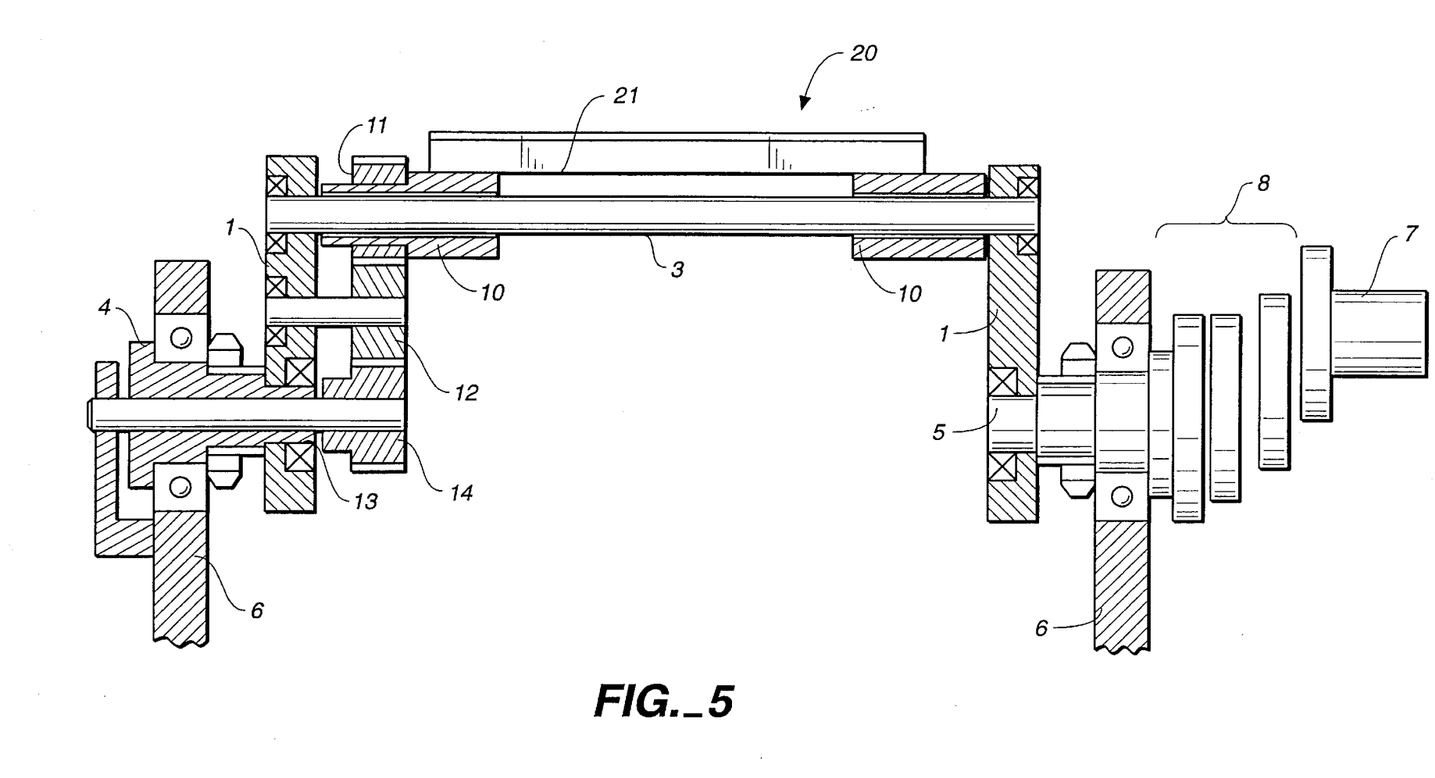
FIG. 5 is a sectional view of a driving mechanism for the sealing unit of FIGS. 2–4.

As shown in FIG. 5, the mechanism for causing each seal jaw 21 to move in a specified D-shaped trajectory, as described above, includes a pair of rotary arms 1 connected to each other by a perpendicularly attached connecting shaft 3. One end of one of the rotary arms 1 is affixed to a support shaft 4 on a mobile frame 6, and the other rotary arm 1 is affixed at one end to a power input shaft 5 on the mobile frame 6 and is coupled to a drive shaft 7 of a motor (not shown) through a Schmidt coupling mechanism 8. As the rotary arms 1 of the pair of sealing units 20A and 20B are rotated together inwardly in mutually opposite directions towards each other (when seen from above), their mobile frames 6 are moved towards and away from each other according to a predefined timing program such that the seal jaws 21A and 21B supported by the sealing units 20 will each undergo the desired D-shaped trajectory, as shown in FIG. 6.

As shown in FIG. 5, bearings 10 are slidably supported around the connecting shaft 3. A planet gear 11, which engages through an idler gear 12 with a sun gear 14 having the same number of teeth, is affixed to one of the bearings 10 such that the orientations of the seal jaws 21A and 21B remain the same, independently of the rotary motion of the rotary arms 1 around the sun gear 14.

Figure 2:
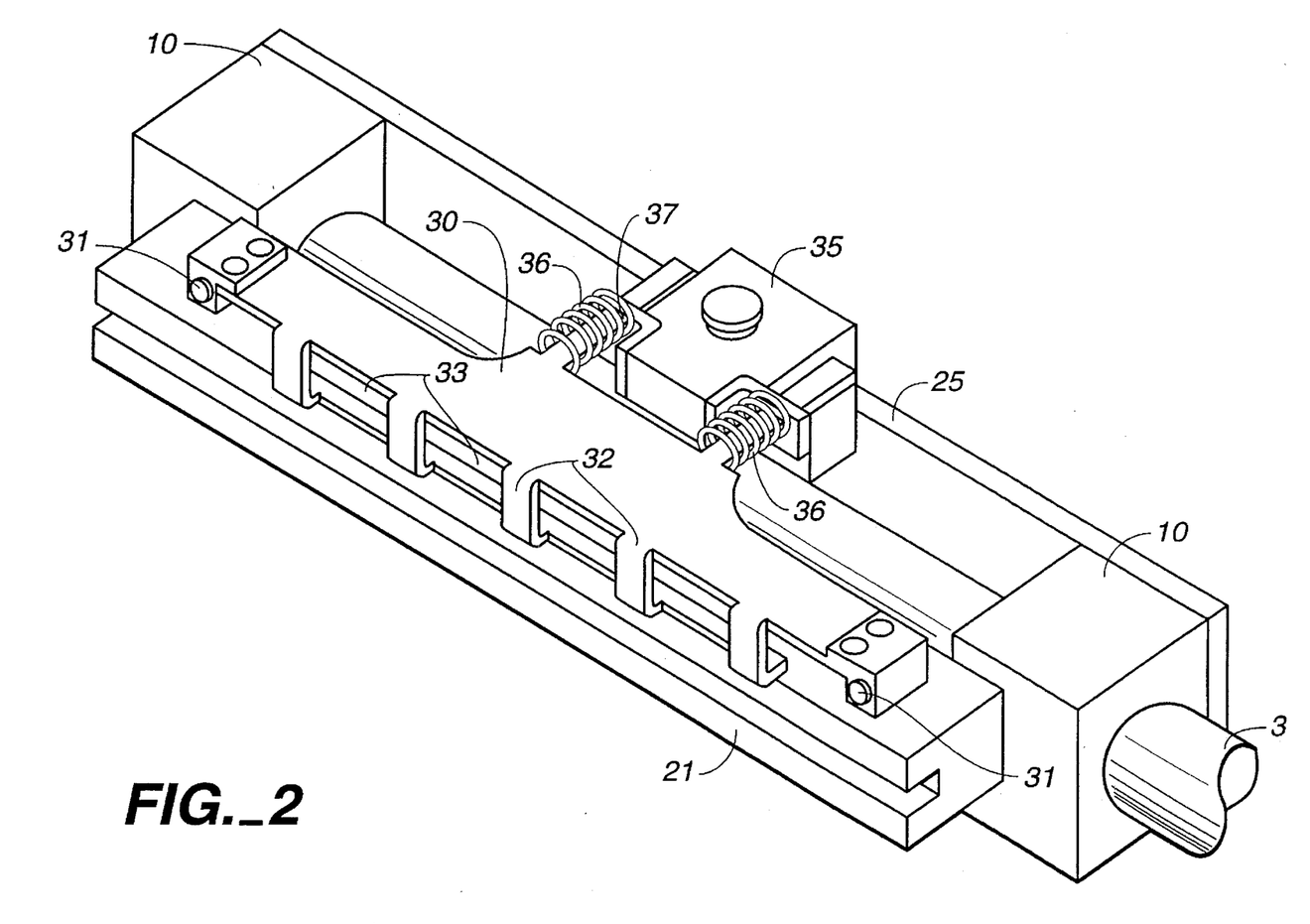
FIG. 2 is a diagonal view of one of sealing units of a transverse sealer embodying this invention.

As shown in FIGS. 2 and 4, each of the sealing units 20 is composed substantially of a seal jaw 21, a shutter 30A or 30B (or 30 when not distinguished) and a so-called stripping plate 23. The seal jaws 21 are adapted to undergo a periodic motion along the aforementioned D-shaped trajectories while being supported by the pair of bearings 10 and, when effecting transverse sealing, are compressed towards each other, as shown in FIG. 6 (between positions II and III), sealing the now tubularly shaped film pieces f together over a seal area serving as the boundary between the top edge of one bag to be formed and the bottom edge of the adjoining bag.

During the stripping phase in the cycle of sealing operation (between positions I and II in FIG. 6), the stripping plates 23 of the two sealing units 20 compress the film pieces f therebetween such that articles being dropped from above into the bag being formed are forcibly pushed downward (or "stripped") so as not to remain in the seal area over which the seal jaws 21 compress the film pieces f. In order to be able to function in this manner, each stripping plate 23 is unitarily attached to the "leading side" of one of the bearings 10 through a connecting member 25 so as to be on the "leading side" of the seal jaw 21 (that is, the stripping plates 23 move ahead of the seal jaws 21 during the stripping phase). This is such that the stripping plates 23 of the pair of sealing units 20 can squeeze the film pieces f therebetween from both sides to serve their stripping function before two seal jaws 21A and 21B are brought together for effecting transverse sealing. For this purpose, the stripping plates 23 are attached to the bearings 10 slidably and biased by compressive springs 24 in the directions towards each other. Since the sealing units 20 are moving downward when the sealing takes place, the aforementioned leading side of the bearings 10 are actually the lower side of the bearings 10, as can be seen in FIG. 4. In order to allow small pieces to drop between the stripping plates 23, the stripping plates 23 are designed such that gaps are provided therebetween even when they are pushed towards each other.

The shutters 30A and 30B are for the purpose of sandwiching the film pieces f and pushing them towards each other during the stripping phase of the cycle of operation such that powder-like small pieces falling more slowly and behind the articles to be packaged will be prevented from entering the seal area. These shutters 30A and 30B are supported by supporting members 35 attached to the connecting members 25 on the "trailing" side (with respect to the direction of motion of the sealing units 20 in the stripping phase) of the bearings 10 (that is, opposite to the stripping plates 23), as shown more clearly in FIG. 4.

Described more in detail with reference to FIG. 2, each shutter 30 is made of a thin planar material with several elongated contact pieces 32 protruding inward (that is, towards the other of the shutters 30) and bent perpendicularly downward. Each supporting member 35 is provided with holes 37 serving as guide holes, as shown in FIG. 4. Each shutter 30 has two elongated parts protruding outward (that is, away from the other of the shutters 30) to be admitted into these guide holes 37. Compression springs 36 are provided around these outwardly protruding parts, as shown more clearly in FIGS. 2 and 3, such that the pair of shutters 30 is biased and slidable in the direction towards each other.

Each shutter 30 is also provided with a pair of stoppers 31A or 31B (or 31 when not distinguished) flanking these downwardly bent contact pieces 32. The separation between the pair of stoppers 31 on each shutter 31 is greater than the width of the film piece f so as to allow the film pieces f to pass therebetween. When the pair of shutters 30 approaches each other, the stoppers 31 on different ones of the shutters 30 come into contact, as shown in FIG. 4.

In FIG. 4, letter D indicates the distance by which each shutter 30 normally protrudes inward, or towards the other, from the inner surface of the seal jaw 21 facing inward, or towards the opposite seal jaw 21, and letter L indicates the vertical distance by which a falling piece of article, which just passed the space between the pair of shutters 30 without getting caught therebetween, must further fall in order not to be caught between the pair of seal jaws 21 when they are moved towards each other.

Figure 3:
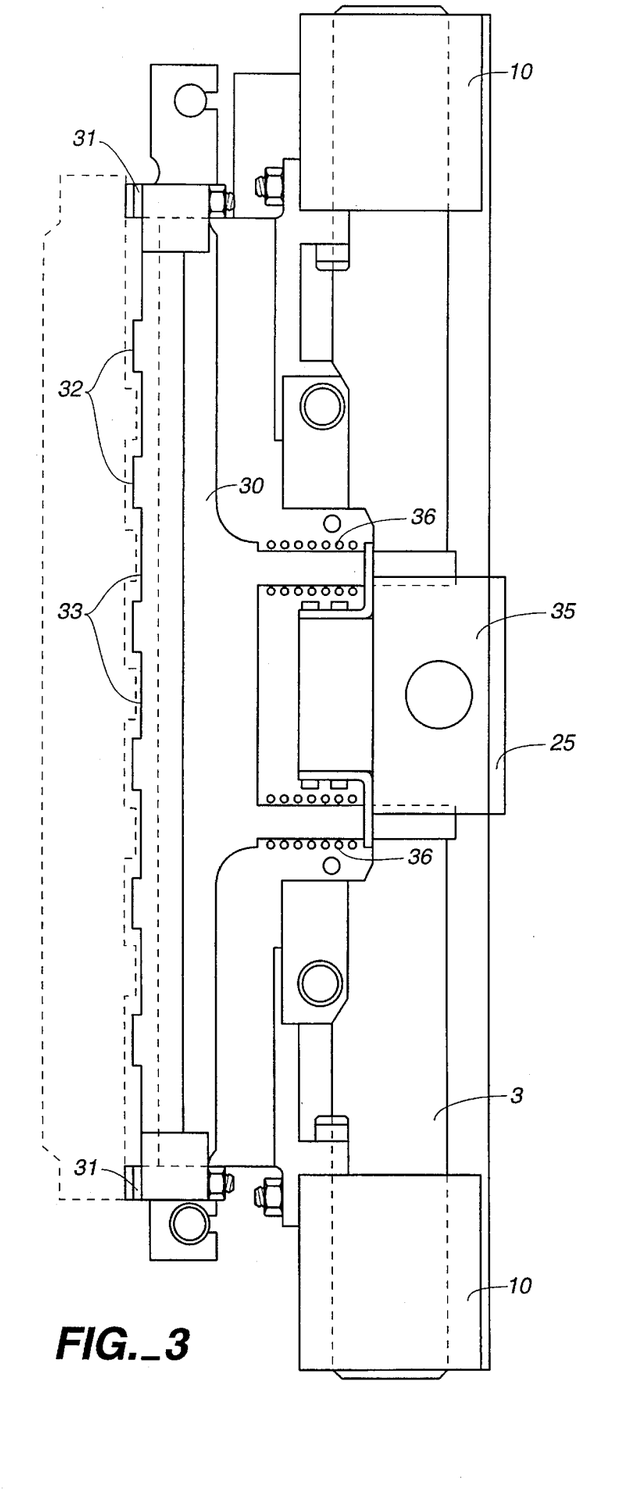
FIG. 3 is a plan view of the sealing unit of FIG. 2.
Figure 7:
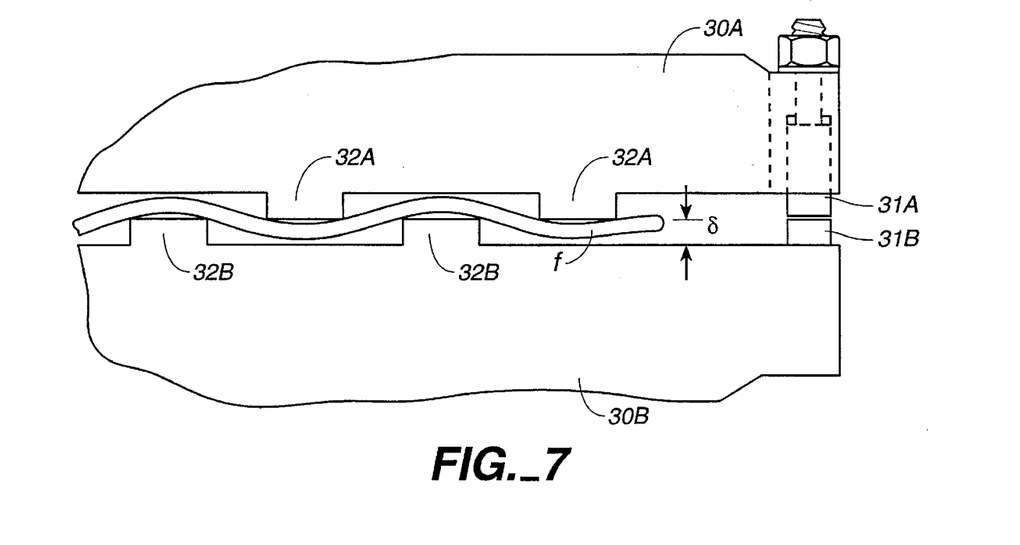
FIG. 7 is a plan view of a portion of a pair of shutters when they are mutually contacting.

As shown in FIGS. 2 and 3, the downwardly bent contact pieces 32 protruding from each shutter 30 are separated from one another, providing window parts 33 in between. As shown in FIGS. 3 and 7, the contact pieces 32 and the window parts 33 of the pair of shutters 30 serve as protrusions and indentations on the inwardly facing surfaces of the shutters 30, respectively, and are so arranged that they will not be in head-to-head relationship when they are brought towards each other but will stagger such that the contact pieces 32 protruding (and bent) from each of the shutters 30 will approach the window parts 33 formed on the other and there will be left a small gap δ of about 1 mm when the pair of shutters 30 is brought toward each other until their stoppers 31A and 31B come into contact with each other, as shown in FIG. 7. The window parts 33 are wider than the contact pieces 32 such that the film f sandwiched therebetween is bent into a serpentine shape, and there is a space left in between such that air can escape therethrough. In FIG. 4, numerals 38 indicate covers for protecting the sealing units 20 from powder-like small pieces.

Next, the purpose and the functions of the shutters 30, as well as the timing relationship between the closing of the shutters 30 and the seal jaws 24 will be explained in detail.

Figure 8:
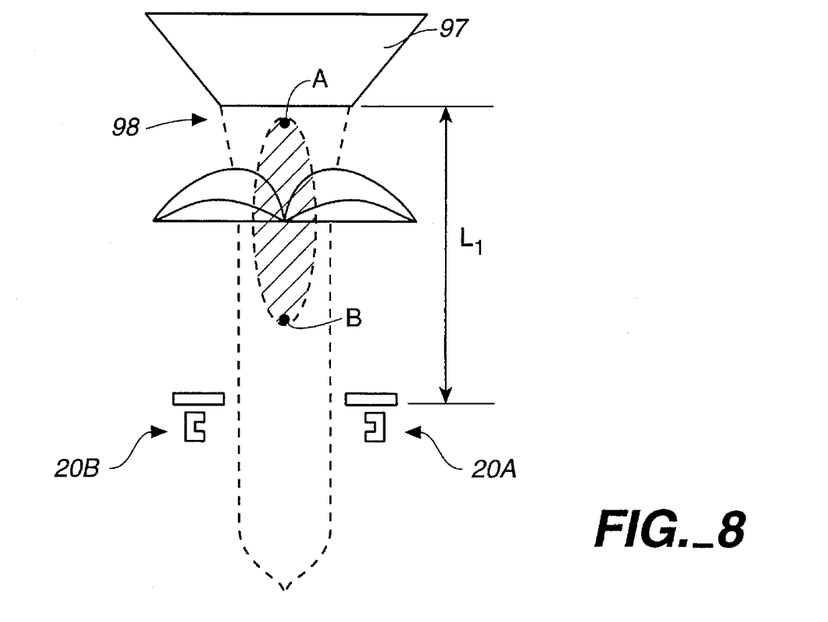
FIG. 8 is a schematic side view of a bag being made by a bag maker embodying this invention to show the manner in which articles to be packaged are dropped.
Figure 9:
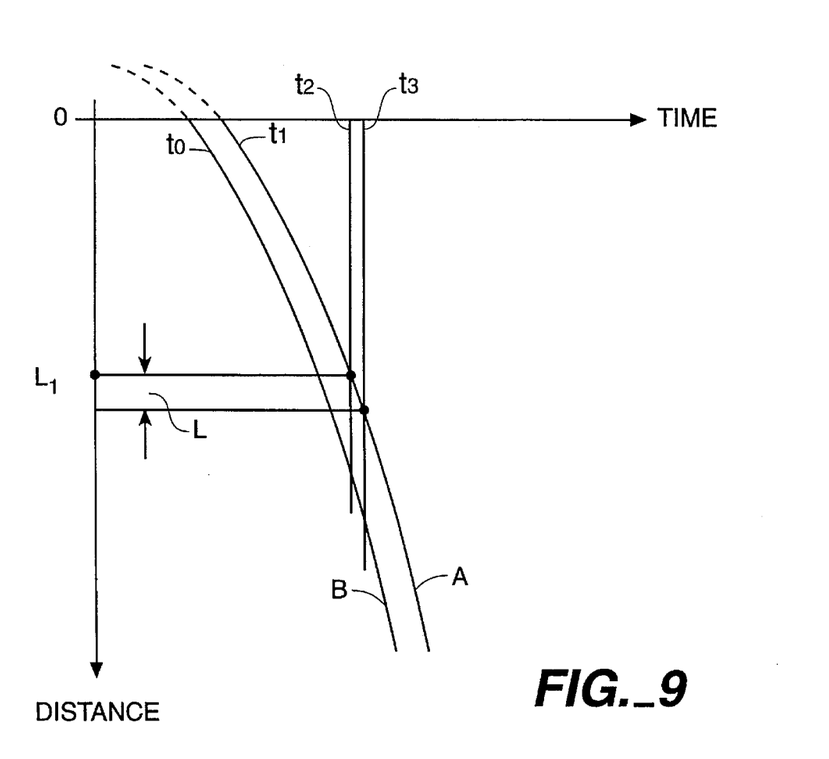
FIG. 9 is a schematic graph for showing the motion of articles dropped as shown in FIG. 8.

As the transverse sealer is cyclically operated according to a prepared program, causing the rotary arms 1 to move the sealing units 20 along predetermined D-shaped trajectories, as shown in FIG. 6, articles to be packaged are dropped also cyclically in batches into the bags being made. As they fall, articles in each batch are necessarily spread spatially with a finite extension both in horizontal and vertical directions. This is schematically illustrated in FIG. 8, wherein 0 indicates the position of the hopper (shown at 97 in FIG. 1) where articles to be packaged are dropped in batches and letters A and B indicate the top and the bottom positions, respectively, of a batch of articles released from the hopper and dropping together in any one cycle of operation. FIG. 9 shows schematically how a batch of articles thus released together will drop inside the tubular film f from the starting position 0 and pass the positions of the shutters 30 and the seal jaws 21.

In FIG. 9, $t_0$ indicates the time at which the batch of articles is initially released and the articles at the bottom point B of the batch begin to fall, and $t_1$ indicates the somewhat later time at which last of the articles in the batch is released from the starting position 0, beginning to fall at the top A of the batch. The vertically downward distance traveled by the articles at the top A and the bottom B of the batch is schematically plotted against time in FIG. 9, wherein $L_1$ indicates the vertical distance between the starting position 0 and the shutters 30; Curves $F_A$ and $F_B$ respectively represent the motion of the top and bottom points A and B of the falling batch.

As the sealing units 20 reach the positions indicated by I in FIG. 6 in their cyclic motion, their shutters 30 come to compress the film pieces f therebetween with their stoppers 31 in contact with each other, but their seal jaws 21A and 21B are still separated from each other. As the sealing units 20 move from the level I to II, the tubularly formed film pieces f are stripped, and the seal jaws 21A and 21B keep approaching each other. Meanwhile, the shutters 30A and 30B remain compressed against each other, against the biasing force of the springs 36. Since there is left a gap between the two shutters 30, as explained above, small pieces falling after the articles to be packages are thereby screened and prevented from further dropping, but the air trapped inside the film pieces f is allowed to escape upwards.

Figure 10A:
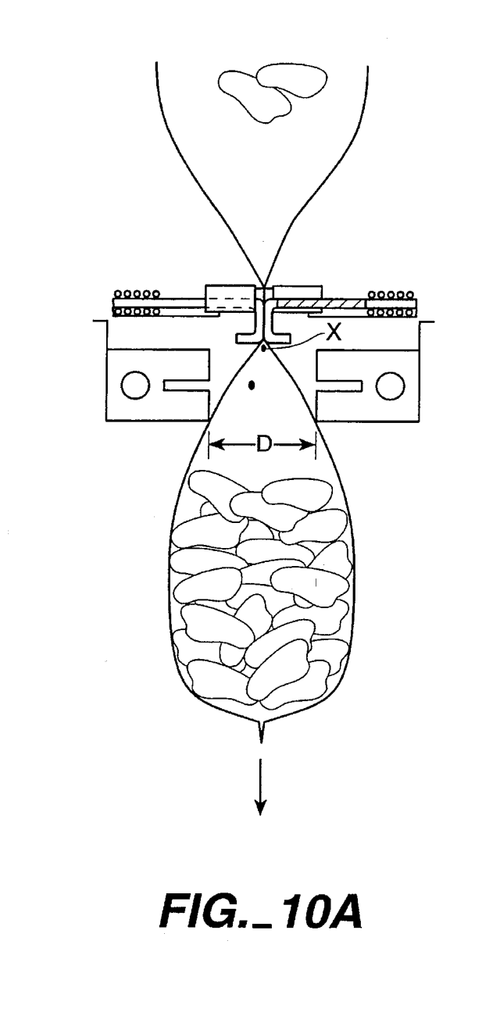
FIGS. 10A, 10B and 10C are schematic side views of a bag at different stages of being filled and sealed by a bag maker embodying this invention.

The time at which Curve $F_A$ passes the position indicated by distance $L_1$ is indicated in FIG. 9 by $t_2$, representing the moment when the batch has just cleared the space between the shutters 30. The movements of the sealing units 20 are so coordinated that the shutters 30, moving with the seal jaws 21, will close the gap therebetween at this moment ($t_2$), as shown in FIG. 10A, in which letter X schematically indicates one of the small pieces which just managed to clear the space between the closing shutters 30. It should be of interest to note that FIG. 10A also shows some of the articles falling down in the next batch intended to be packaged in the next cycle of operation. The vertical distance between the top of one batch and the bottom of the next batch can be as small as about 300 mm in the case of a high-speed operation of a bag maker embodying this invention.

Figure 10B:
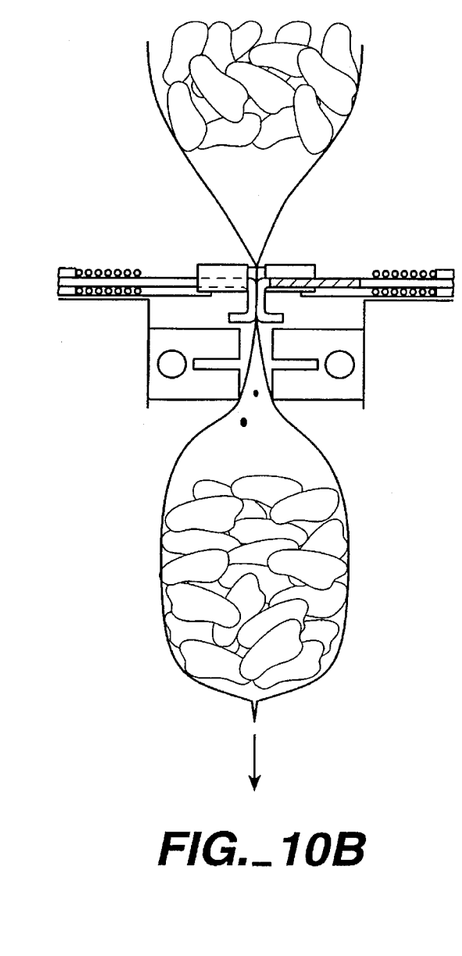
Figure 10C:
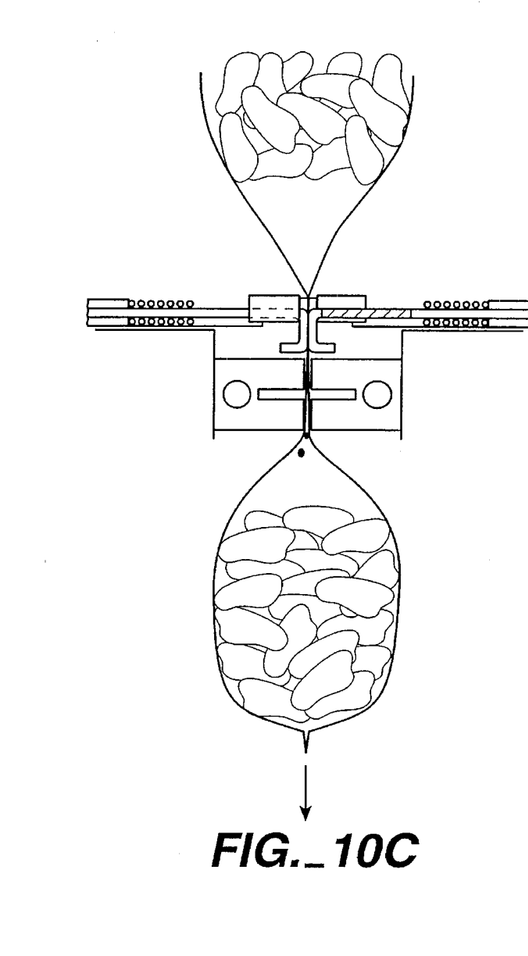

With reference back to FIG. 9, the time at which Curve $F_A$ passes the position of the seal jaws 21 is indicated by $t_3$, and the movements of the sealing units 20 are so coordinated that the pair of seal jaws 21 will close the gap therebetween at the same time ($t_3$), starting the transverse sealing. FIG. 10C shows the positions of the shutters 30 and the seal jaws 21 at time $t_3$, and FIG. 10B shows them at some time between $t_2$ and $t_3$. The speed with which the seal jaws 21 are moved towards each other between times $t_2$ and $t_3$ is therefore given by $D/(t_3-t_2)$. According to this invention, the distance of protrusion D is set in such a way that $10D \geq L$ (L being as defined above). As the seal jaws 21A and 21B approach the film pieces f from both sides with this speed, the air at the seal area is pushed out by the pressure from the approaching seal jaws 21A and 21B, carrying with it powder-like small pieces remaining in the area. After the thermal sealing of the film pieces f is completed at the position III shown in FIG. 6, a cutter (shown at 113 in FIG. 1) is activated to cut the film pieces f transversely in the middle of the seal area to finish the cycle of operation.

Although the invention has been described above by way of only one example, this example is not intended to limit the scope of the invention. For example, although a bag maker of a type which transports the film f continuously to form bags was used to illustrate the invention, a transverse sealer according to this invention can be incorporated equally well in a bag maker of a type which transports a film in an intermittent manner except, in such an application, each sealing unit 20 must be adapted to move vertically and horizontally in a rectangular trajectory.

In summary, a transverse sealer according to this invention is characterized as having a pair of shutters above the seal jaws so as to always protrude inwardly from the seal jaws to prevent powder-like small pieces from flowing past therethrough, while leaving small gaps therebetween even when they are in contact with each other. The film pieces sandwiched therebetween are pushed into a serpentine shape such that small pieces are reliably prevented from remaining in the seal area between the seal jaws when they are brought together for transverse sealing.

What is claimed is:

1. A transverse sealer for a bag maker adapted to bend an elongated bag-making film into a tubular shape to cyclically form a bag and to simultaneously fill said bag with a batch of articles, said transverse sealer comprising:

a pair of seal jaws opposite each other across a path of said film, said seal jaws being adapted to move inwardly towards each other to seal said film in a transverse direction over a seal area and outwardly away from each other; and a pair of shutters each disposed on one of said seal jaws and adapted to approach each other above said seal area to thereby prevent articles in a next batch from passing thereacross, said shutters normally protruding inwardly from said seal jaws and being inwardly biased, said shutters having inwardly facing surfaces each having protrusions and indentations alternately arranged in said transverse direction, said protrusions on one of said shutters each facing corresponding one of said indentations on the other of said shutters with a gap therebetween when said shutters contact each other.

2. A transverse sealer for a bag maker adapted to bend an elongated bag-making film into a tubular shape to cyclically form a bag and to simultaneously fill said bag with a batch of articles, said transverse sealer comprising:

a pair of seal jaws on opposite each other across a path of said film, said seal jaws being adapted to move inwardly towards each other to seal said film in a transverse direction over a seal area and outwardly away from each other; and a pair of shutters each disposed on one of said seal jaws and adapted to approach each other above said seal area to thereby prevent articles in a next batch from passing thereacross, said shutters normally protruding inwardly from said seal jaws by distance D and being inwardly biased, the distance L by which an article must fall after passing between said shutters to pass through said seal area being such that 10D≧L.

3. A bag maker adapted to bend an elongated bag-forming film into a tubular shape to cyclically form a bag and to simultaneously fill said bag with a batch of articles, said bag maker comprising:

a web supporting means supporting a web roll having a web of said elongated film wound around a core shaft;

a former for forming said web into a tubular shape;

web guiding means for guiding said web from said web roll to said former and said tubularly formed web in a longitudinal direction;

a longitudinal sealer for sealing side edges of said tubularly formed web together in said longitudinal direction; and a transverse sealer for sealing said web in a transverse direction with respect to said longitudinal direction and thereby forming a bag; said transverse sealer comprising:

a pair of seal jaws opposite each other across a path of said film, said seal jaws being adapted to move inwardly towards each other to transversely seal said film over a seal area and outwardly away from each other; and a pair of shutters each disposed on one of said seal jaws so as to each move behind corresponding one of said seal jaws when said seal jaws are moving in said longitudinal direction, said shutters normally protruding inwardly from said seal jaws and being inwardly biased, said shutters having inwardly facing surfaces each having protrusions and indentations alternately arranged in said transverse direction, said protrusions on one of said shutters each facing corresponding one of said indentations on the other of said shutters with a gap therebetween when said shutters contact each other.

4. The bag maker of claim 3 further comprising stripping means for contacting said film and stripping down articles from said seal area inside said film, said stripping means being disposed on said seal jaws so as to move ahead of said seal jaws when said seal jaws are moving in said longitudinal direction.

5. The bag maker of claim 3 further comprising driving means for causing each said seal jaws to move in a closed trajectory which includes a substantially vertically straight portion along said path of said film.

6. The bag maker of claim 5 wherein said driving means include a pair of rotary arms on opposite sides of said path and adapted to rotate in mutually opposite directions, said seal jaws being attached to said rotary arms and moved thereby.

7. A bag maker adapted to bend an elongated bag-forming film into a tubular shape to cyclically form a bag and to simultaneously fill said bag with a batch of articles, said bag maker comprising:

a web supporting means supporting a web roll having a web of said elongated film wound around a core shaft;

a former for forming said web into a tubular shape;

web guiding means for guiding said web from said web roll to said former and said tubularly formed web in a longitudinal direction;

a longitudinal sealer for sealing side edges of said tubularly formed web together in said longitudinal direction; and a transverse sealer for sealing said web in a transverse direction with respect to said longitudinal direction and thereby forming a bag; said transverse sealer comprising:

a pair of seal jaws opposite each other across a path of said film, said seal jaws being adapted to move inwardly towards each other to transversely seal said film over a seal area and outwardly away from each other; and a pair of shutters each disposed on one of said seal jaws so as to each move behind corresponding one of said seal jaws when said seal jaws are moving in said longitudinal direction, said shutters normally protruding inwardly from said seal jaws by distance D and being inwardly biased, the distance L by which an article must fall after passing between said shutters to pass through said seal area being such that 10D≧L.

8. The bag maker of claim 7 further comprising stripping means for contacting said film and stripping down articles from said seal area inside said film, said stripping means being disposed on said seal jaws so as to move ahead of said seal jaws when said seal jaws are moving in said longitudinal direction.

9. The bag maker of claim 7 further comprising driving means for causing each said seal jaws to move in a closed trajectory which includes a substantially vertically straight portion along said path of said film.

10. The bag maker of claim 7 wherein said driving means include a pair of rotary arms on opposite sides of said path and adapted to rotate in mutually opposite directions, said seal jaws being attached to said rotary arms and moved thereby.

* * * * *